United States Patent
Li

(10) Patent No.: US 10,509,257 B2
(45) Date of Patent: Dec. 17, 2019

(54) DISPLAY PANELS, WIRE GRID POLARIZERS, AND THE MANUFACTURING METHODS THEREOF

(71) Applicant: Shenzhen China Star Optoelectronics Technology Co., Ltd., Shenzhen, Guangdong (CN)

(72) Inventor: Minghui Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 48 days.

(21) Appl. No.: 15/533,020

(22) PCT Filed: May 17, 2017

(86) PCT No.: PCT/CN2017/084689
§ 371 (c)(1),
(2) Date: Jun. 3, 2017

(87) PCT Pub. No.: WO2018/176604
PCT Pub. Date: Oct. 4, 2018

(65) Prior Publication Data
US 2018/0284535 A1 Oct. 4, 2018

(30) Foreign Application Priority Data
Mar. 29, 2017 (CN) .......................... 2017 1 0197653

(51) Int. Cl.
*G02F 1/1335* (2006.01)

(52) U.S. Cl.
CPC .. *G02F 1/133528* (2013.01); *G02F 1/133617* (2013.01); *G02F 2001/133548* (2013.01); *G02F 2001/133565* (2013.01); *G02F 2202/28* (2013.01); *G02F 2202/36* (2013.01)

(58) Field of Classification Search
None
See application file for complete search history.

(56) References Cited

U.S. PATENT DOCUMENTS

| 9,411,191 | B2 | 8/2016 | Chung et al. |
| 9,759,947 | B2 | 9/2017 | Liu et al. |
| 2004/0036817 | A1 | 2/2004 | Paukshto et al. |
| 2004/0250945 | A1 | 12/2004 | Zheng et al. |

(Continued)

FOREIGN PATENT DOCUMENTS

| CN | 105954932 A | 9/2016 |
| CN | 106019454 A | 10/2016 |

*Primary Examiner* — Richard H Kim
(74) *Attorney, Agent, or Firm* — Andrew C. Cheng

(57) ABSTRACT

The present disclosure relates to a manufacturing method of wire grid polarizers. The manufacturing method includes: forming a wire grid structure on a mold substrate, wherein the wire grid structure comprises a plurality of wire grids spaced apart from each other, bonding the wire grid structure with a carrier substrate by quantum-dot (QD) adhesive, wherein the QD adhesive includes QD material and adhesive, and detaching the wire grid structure from the mold substrate. The manufacturing process of the wire grid polarizers may be simplified and the yield rate may be enhanced. With the configuration, the color range, the brightness, and the optical performance of the display panel may be enhanced.

2 Claims, 3 Drawing Sheets

(56) References Cited

U.S. PATENT DOCUMENTS

| | | |
|---|---|---|
| 2008/0137188 A1 | 6/2008 | Sato et al. |
| 2008/0145568 A1 | 6/2008 | Lee et al. |
| 2012/0176676 A1 | 7/2012 | Sakamoto |
| 2012/0244279 A1* | 9/2012 | Ishihara ........... B29D 11/00634 427/163.1 |
| 2017/0261806 A1 | 9/2017 | Niu et al. |
| 2018/0100090 A1* | 4/2018 | Li .......................... B82Y 20/00 |

\* cited by examiner

DISPLAY PANELS, WIRE GRID POLARIZERS, AND THE MANUFACTURING METHODS THEREOF

BACKGROUND OF THE INVENTION

1. Field of the Invention

The present disclosure relates to display technology, and more particularly to a display panel, a wire grid polarizer, and the manufacturing method thereof.

2. Discussion of the Related Art

Compared with the conventional absorptive polymer thin film polarizer, the nano wire-grid polarizer can reflect the direction of the electric field in the direction perpendicular to the direction of the grid, and the light direction is parallel to the light in the direction of the grid. By configuring anti-reflective film, the capability of the nano wire-grid polarizer with respect to the incident light is much greater than the traditional polarizer. The transmittance may be up to 90%, while the contrast is also high 10000:1. Thus, the LCD light transmittance and contrast may be greatly enhanced so as to meet the high transmittance and high contrast demand in the LCD field. In addition, since the subwavelength wire grid polarizer can achieve excellent durability in a high temperature or high humidity environment, the wire grid polarizer has an unparalleled advantage in areas, such as outdoor, where the reliability requirements are harsh.

At present, nano-imprint technology is adopted to produce wire grid structure. The manufacturing process is complex, including steps such as photoresist, mold release, etching metal, removing the photoresist, and etching, etc. Due to the width and the height of the wire grid structure in nanometer scale, the etching process is difficult. In addition, the formed wire grid is prone to collapse, and the photoresist may residue. Also, the etching effect may not be good enough, such as uneven surface. The disadvantages may include bad polarization performance, long manufacturing process, complex manufacturing process, and low efficiency.

SUMMARY

The present disclosure relates to a display panel, a wire grid polarizer, and a manufacturing method thereof for simplifying the manufacturing process of the wire grid polarizer and to enhance the yield rate. With the configuration, the color range, the brightness, and the optical performance of the display panel may be enhanced.

In one aspect, a display panel includes: a first substrate, a second substrate opposite to the first substrate, a liquid crystal layer configured between the first substrate and the second substrate, and a wire grid polarizer configured on the first substrate or the second substrate, wherein the wire grid polarizer includes a carrier substrate, a quantum dot (QD) adhesive layer, and a wire grid structure being bonded with the carrier substrate by the QD adhesive layer, the wire grid structure includes a plurality of wire grids spaced apart from each other, the QD adhesive layer includes QD materials and adhesive, a wire grid cycle of the wire grid structure is in a range from 100 to 300 nm, a wire grid width is in a range from 50 to 200 nm, and the wire grid structure is made by aluminum, Cr, gold, silver, or Ni.

In another aspect, a manufacturing method of wire grid polarizers includes: forming a wire grid structure on a mold substrate, wherein the wire grid structure includes a plurality of wire grids spaced apart from each other; bonding the wire grid structure with a carrier substrate by quantum-dot (QD) adhesive, wherein the QD adhesive includes QD material and adhesive; and detaching the wire grid structure from the mold substrate.

In another aspect, a wire grid polarizer includes: a carrier substrate, a quantum dot (QD) adhesive layer, and a wire grid structure being bonded with the carrier substrate by the QD adhesive layer, the wire grid structure includes a plurality of wire grids spaced apart from each other, the QD adhesive layer includes QD materials and adhesive.

In view of the above, the wire grid structure includes a plurality of wire grids spaced apart from each other. The wire grid structure and the carrier substrate are bonded together by the QD adhesive, including the QD material and the adhesive. The wire grid structure is detached from the mold substrate. By adhering the wire grid structure on the carrier substrate, the manufacturing process of the wire grid polarizer may be simplified. The adhesive includes QD materials. As the purity and the brightness of the QD materials are high after the QDs are activated, the color range, the brightness, the optical performance of the display panel may be effectively enhanced. Further, the display panel having high color range, high transmission rate, and high contrast may be obtained by further incorporating the polarization performance of the wire grid structure.

DETAILED DESCRIPTION OF THE EMBODIMENTS

Embodiments of the invention will now be described more fully hereinafter with reference to the accompanying drawings, in which embodiments of the invention are shown.

Figure 1:
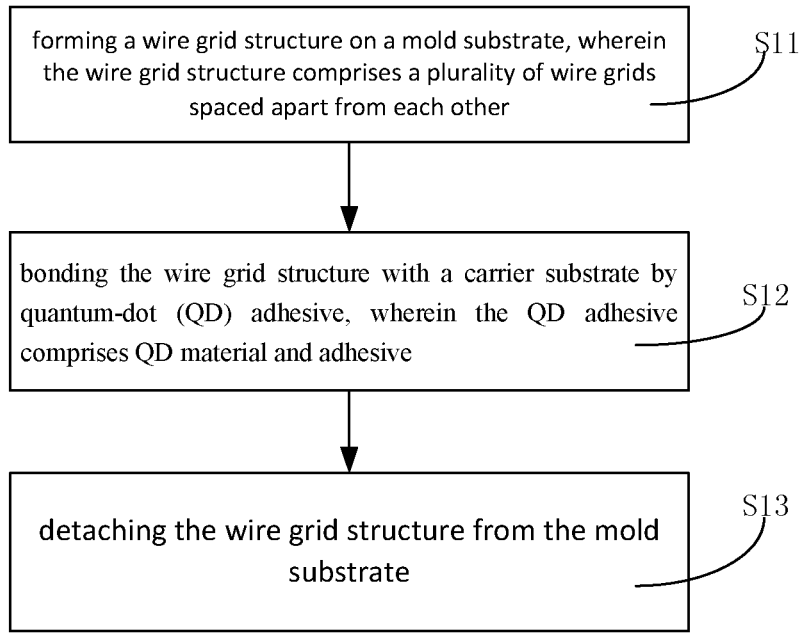
FIG. 1 is a flowchart illustrating the manufacturing method of the wire grid polarizer in accordance with one embodiment of the present disclosure.

FIG. 1 is a flowchart illustrating the manufacturing method of the wire grid polarizer in accordance with one embodiment of the present disclosure. The manufacturing process includes the following steps:

In step S11, forming a wire grid structure on a mold substrate, wherein the wire grid structure includes a plurality of wire grids spaced apart from each other.

In step S11, the wire grids may be parallel to each other.

Figure 2:
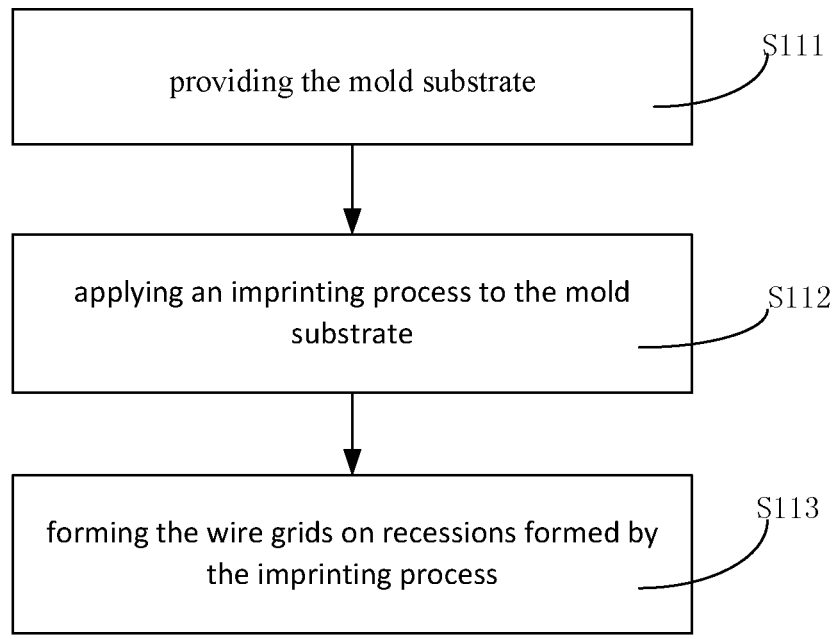
FIG. 2 is a schematic view showing the step S11 in FIG. 1.
Figure 3:
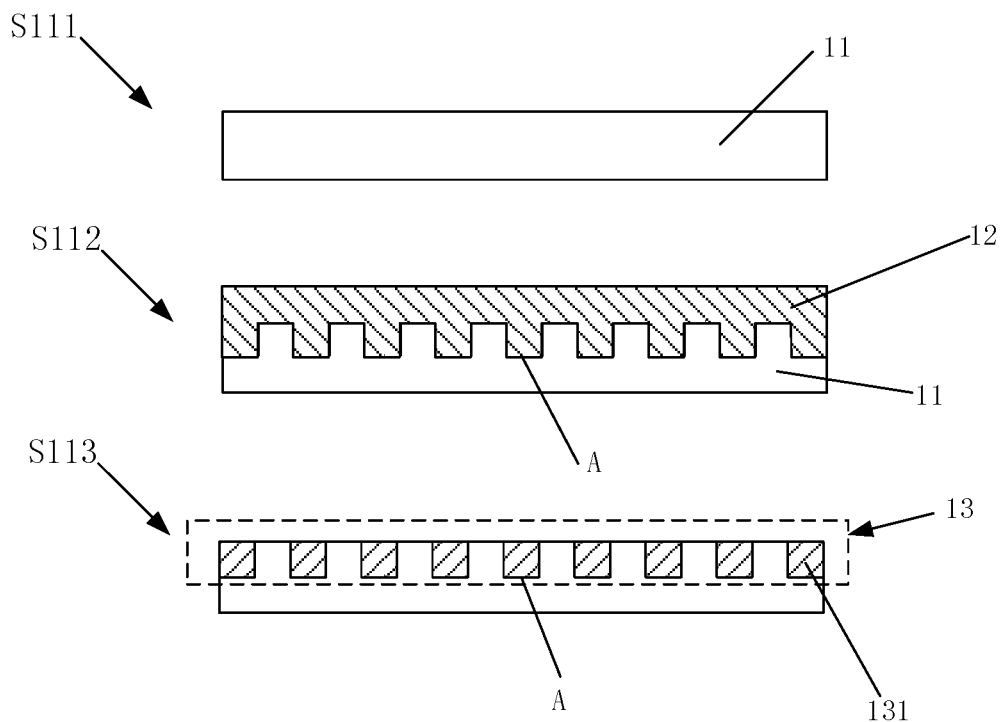
FIG. 3 is a schematic view showing the corresponding manufacturing process in FIG. 2.

FIG. 2 is a schematic view showing the step S11 in FIG. 1. FIG. 3 is a schematic view showing the corresponding manufacturing process in FIG. 2. The step of forming the wire grid structure 13 on the mold substrate 11 may include the following steps:

In step S111, providing a mold substrate;

In an example, the mold substrate 11 may be a thermoplastic substrate, i.e., thermoplastic resin.

In step S112, applying an imprinting process to the mold substrate 11.

In step S112, the mold substrate 11 is heated up. The imprinting process is applied to the mold substrate 11 by the mold substrate 11 so as to form a plurality of recessions (A) on the mold substrate 11. The recessions (A) are parallel to each other and are spaced apart from each other. Afterward, the mold substrate 11 is cooled down, and the first insulation layer 12 is detached from the mold substrate 11.

In step S113, forming the wire grids on the recessions formed by the imprinting process.

In step S113, the wire grids 131 may be formed by depositing the wire grid materials on the recessions (A). The wire grids 131 formed within the recessions (A) constitute the wire grid structure 13. The wire grid structure 13 may be made by metal, such as aluminum, Cr, gold, silver, or Ni. In other embodiments, the wire grid structure 13 may be made by other metal materials.

In step S12, bonding the wire grid structure with a carrier substrate by quantum-dot (QD) adhesive, wherein the QD adhesive includes QD material and adhesive.

Figure 4:
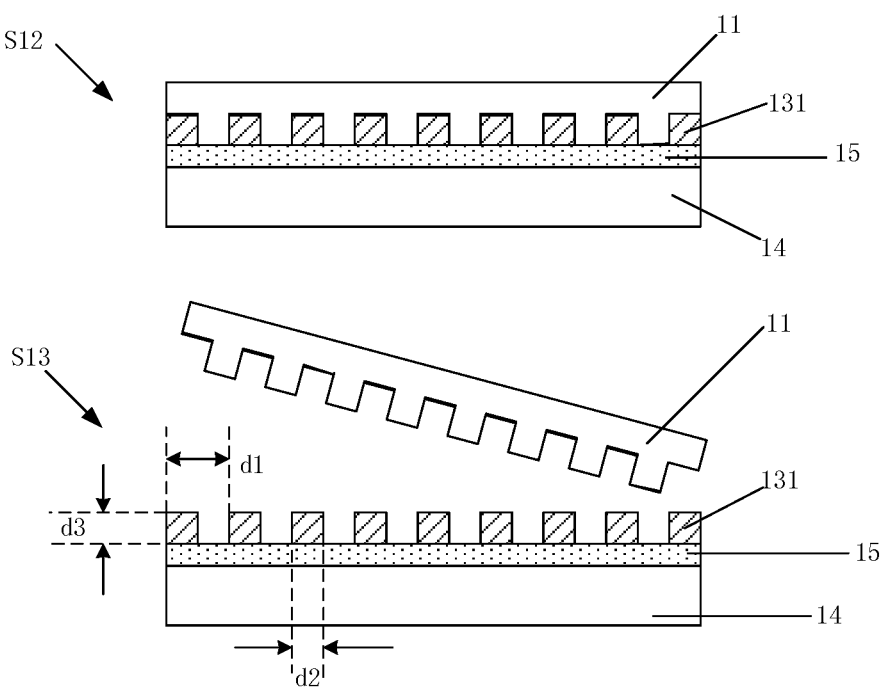
FIG. 4 is a schematic view sowing the manufacturing process corresponding to step S12 and S13 in FIG. 1.

FIG. 4 is a schematic view sowing the manufacturing process corresponding to step S12 and S13 in FIG. 1. For instance, the wire grid structure 13 and the carrier substrate 14 are bonded together by the QD adhesive 15. The QD adhesive 15 may be glue mixed with the QD material.

In step S13, detaching the wire grid structure from the mold substrate 11.

In step S13, the mold substrate 11 is cooled down such that the wire grid structure 13 is detached from the mold substrate 11. Due to the cooling effect of the mold substrate 11, especially the thermoplastic materials, a gap is formed between the wire grid structure 13 after being cooled down and the mold substrate 11. The wire grid cycle (d1) of the wire grid structure 13 may be in a range from 100 to 300 nm, a wire grid width width (d2) may be in a range from 50 to 200 nm, the wire grid thickness (d3) may be in a range from 50 to 500 nm. The carrier substrate 14 may be a hard substrate, i.e., a glass substrate, or a flexible substrate. The wire grid cycle (d1) of the wire grid structure 13 relates to a distance (d1) indicating a width of the wire grid plus a gap configured between two adjacent wire grids. That is, the distance between the left sides of two adjacent wire grids, or the distance between the right sides of two adjacent wire grids.

Figure 5:
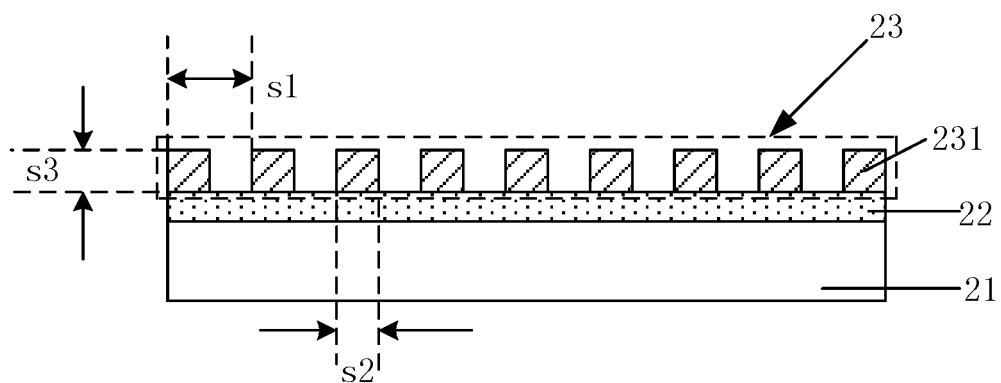
FIG. 5 is a schematic view of the wire grid polarizer in accordance with one embodiment of the present disclosure.

FIG. 5 is a schematic view of the wire grid polarizer in accordance with one embodiment of the present disclosure.

In the embodiment, the wire grid polarizer includes a carrier substrate 21, a QD adhesive layer 22, and a wire grid structure 23. The wire grid structure 23 is bonded with the carrier substrate 21 via the QD adhesive layer 22. The wire grid structure 23 includes a plurality of wire grids 231 spaced apart from each other. The QD adhesive layer 22 includes QD materials and adhesive, i.e., glue.

The wire grid structure 23 may be made by metal, such as aluminum, Cr, gold, silver, or Ni. In other embodiments, the wire grid structure 23 may be made by other metal materials.

The wire grid cycle (d1) of the wire grid structure 23 may be in a range from 100 to 300 nm, the wire grid width (d2) may be in a range from 50 to 200 nm, the wire grid thickness (d3) may be in a range from 50 to 500 nm.

The carrier substrate 21 may be a hard substrate, i.e., a glass substrate, or a flexible substrate.

Figure 6:
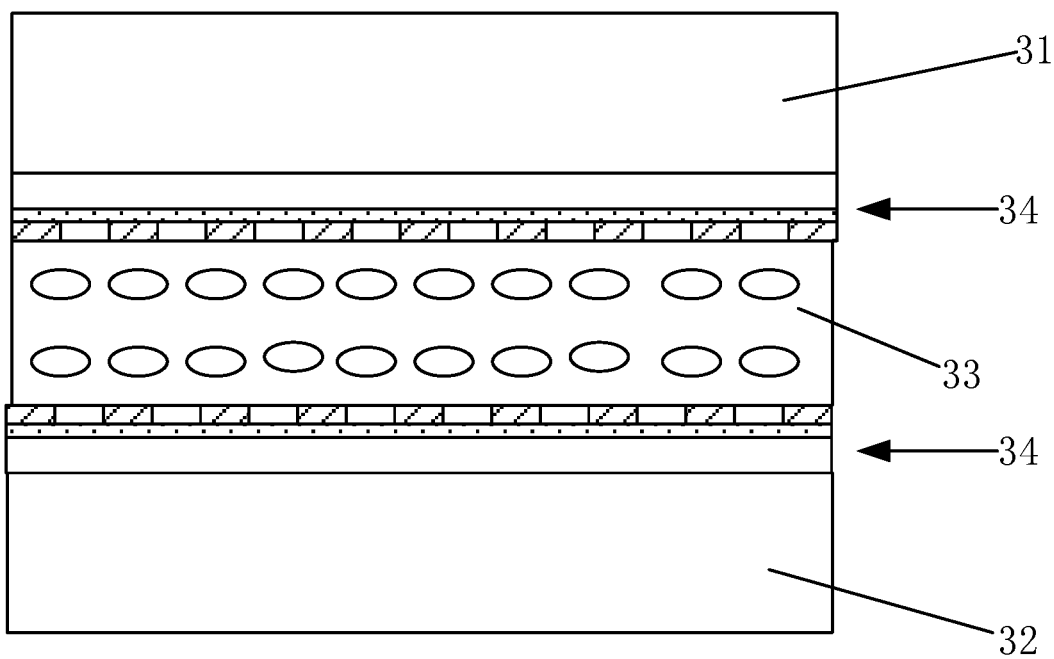
FIG. 6 is a schematic view of the display panel in accordance with one embodiment of the present disclosure.

FIG. 6 is a schematic view of the display panel in accordance with one embodiment of the present disclosure.

In the embodiment, the display panel includes a first substrate 31, a second substrate 32, a liquid crystal layer 33 between the first substrate 31 and the second substrate 32, and a wire grid polarizer 34 arranged on the first substrate 31 or the second substrate 32. The wire grid polarizer 34 may be any one of the wire grid polarizers in the above embodiments.

For instance, the wire grid polarizer 34 may be configured on one surface of the first substrate 31 facing toward the second substrate 32.

For instance, the wire grid polarizer 34 may be configured on one surface of the second substrate 32 facing toward the first substrate 31.

The first substrate 31 may be a color filter (CF) substrate or a TFT array substrate.

The second substrate 32 may be a color filter (CF) substrate or a TFT array substrate.

In view of the above, the wire grid structure includes a plurality of wire grids spaced apart from each other. The wire grid structure and the carrier substrate are bonded together by the QD adhesive, including the QD material and the adhesive. The wire grid structure is detached from the mold substrate. By adhering the wire grid structure on the carrier substrate, the manufacturing process of the wire grid polarizer may be simplified. The adhesive includes QD materials. As the purity and the brightness of the QD materials are high after the QDs are activated, the color range, the brightness, the optical performance of the display panel may be effectively enhanced. Further, the display panel having high color range, high transmission rate, and high contrast may be obtained by further incorporating the polarization performance of the wire grid structure.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display panel, comprising:
   a first substrate, a second substrate opposite to the first substrate, a liquid crystal layer configured between the first substrate and the second substrate, and a wire grid polarizer configured on the first substrate or the second substrate, wherein the wire grid polarizer comprises a carrier substrate, a quantum dot (QD) adhesive layer, and a wire grid structure being bonded with the carrier substrate by the QD adhesive layer, the wire grid structure comprises a plurality of wire grids spaced apart from each other, the QD adhesive layer comprises QD materials and adhesive, a wire grid cycle of the wire grid structure is in a range from 100 to 300 nm, a wire grid width is in a range from 50 to 200 nm, and the wire grid structure is made by aluminum;
   wherein the wire grid polarizer is configured on one surface of the first substrate facing toward the second substrate, and the first substrate is a color filter substrate.

2. The display panel as claimed in claim 1, wherein the carrier substrate is a flexible substrate.

* * * * *